Mar. 27, 1923.  
F. H. BANBURY  
1,449,930  
MACHINE FOR TREATING RUBBER AND OTHER HEAVY PLASTIC MATERIAL  
Filed Jan. 31, 1921    2 sheets-sheet 2
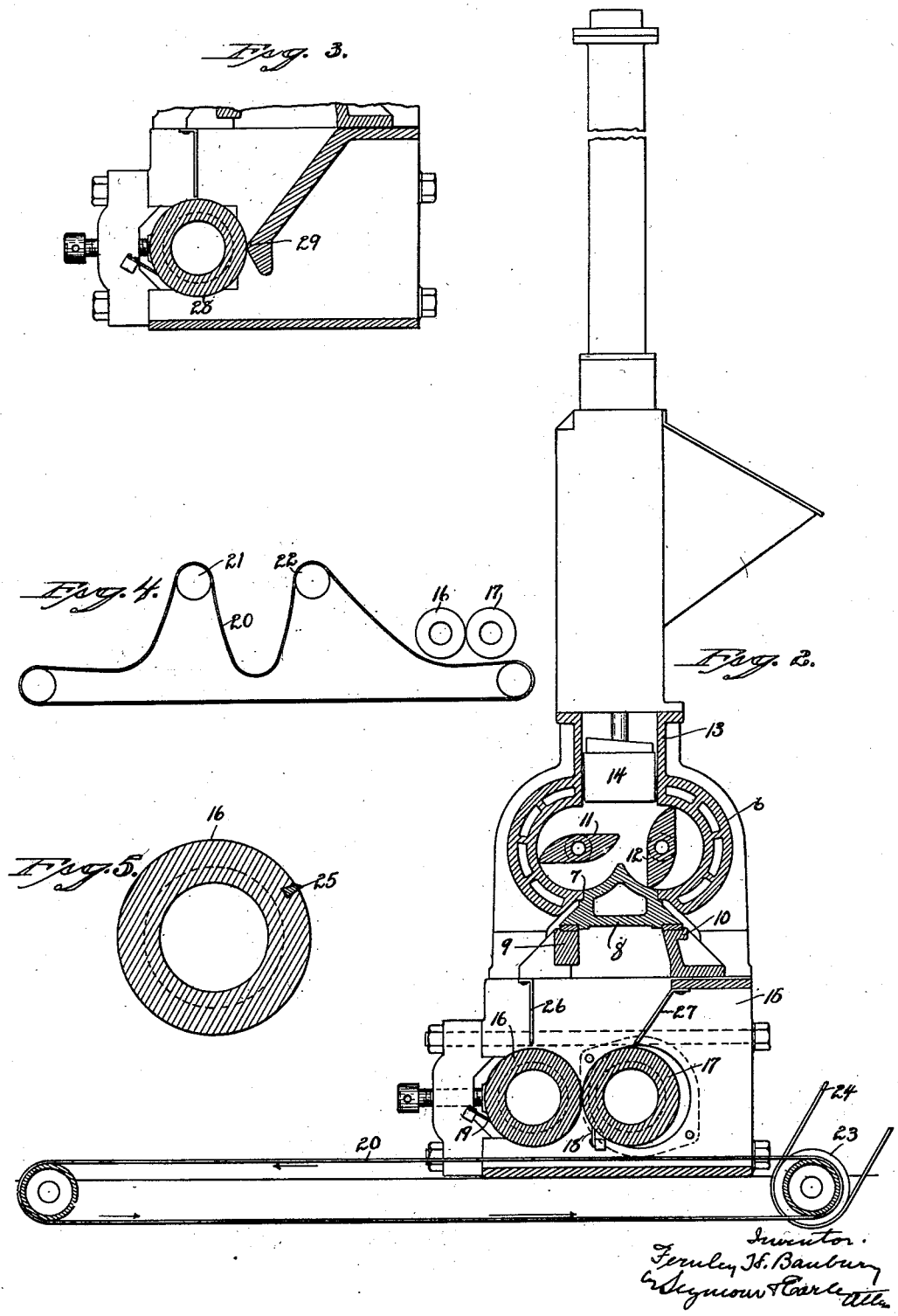

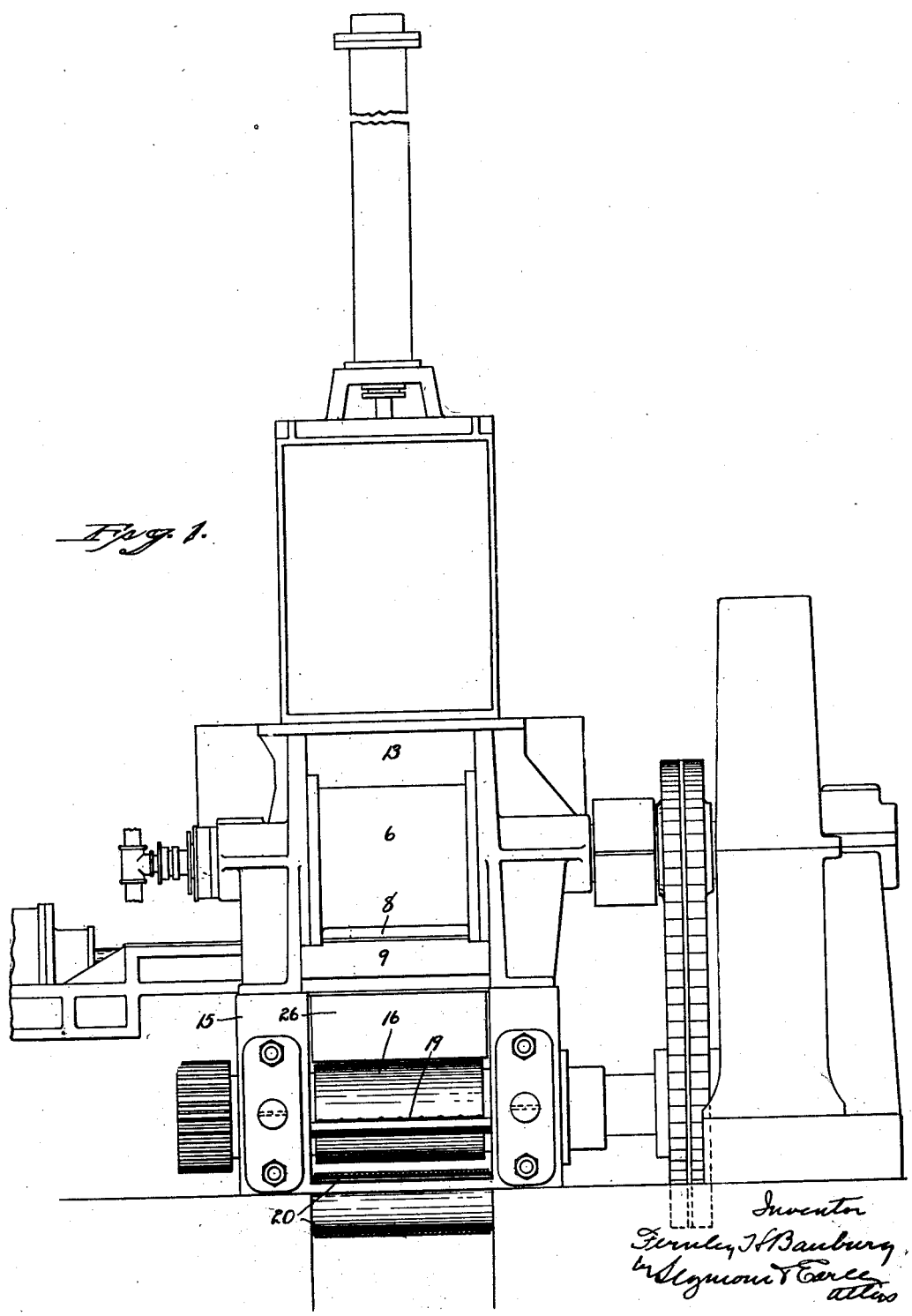

Patented Mar. 27, 1923.

1,449,930

UNITED STATES PATENT OFFICE.

FERNLEY H. BANBURY, OF ANSONIA, CONNECTICUT, ASSIGNOR TO BIRMINGHAM IRON FOUNDRY, OF DERBY, CONNECTICUT, A CORPORATION.

MACHINE FOR TREATING RUBBER AND OTHER HEAVY PLASTIC MATERIAL.

Application filed January 31, 1921. Serial No. 441,209.

*To all whom it may concern:*

Be it known that I, FERNLEY H. BANBURY, a subject of the King of Great Britain, residing at Ansonia, in the county of New Haven and State of Connecticut, have invented a new and useful Improvement in Machines for Treating Rubber and Other Heavy Plastic Material; and I do hereby declare the following, when taken in connection with the accompanying drawings, and the characters of reference marked thereon, to be a full, clear, and exact description of the same, and which said drawings constitute part of this application, and represent in—

Fig. 1 a face view of the machine for treating rubber and other heavy plastic material, constructed in accordance with my invention.

Fig. 2 a side view partly in section of the same.

Fig. 3 a broken sectional view showing modified form of sheeting mechanism.

Fig. 4 a diagrammatical view showing modified form of apron.

Fig. 5 a sectional view of a sheeting roll provided with a cutting-blade.

This invention relates to an improvement in machines for treating rubber and other heavy plastic material, and particularly to machines comprising a casing and one or more rotors arranged therein. In the more general constructions of machines of this type the mixed material is discharged in lumps, and if these lumps are allowed to stand the heat generated in the center of the lump would vulcanize the rubber and destroy it for further use. Efforts have been made to reduce the size of the lumps as discharged from the mixer, and the object of this invention is to provide means to discharge material in sheet form instead of in lump form, so that the material will cool quickly and effectively, and the invention consists in providing delivery mechanism whereby the material is not only mixed but delivered in sheet form. The invention further consists in certain construction and arrangement of parts as hereinafter described and particularly recited in the claims.

In illustrating my invention, I have shown it in connection with a mixer having a central bottom opening, like that shown in U. S. Patent 1,234,526, of July 24, 1917, that is, the mixer comprises a casing 6, provided in the bottom with an opening 7, closed by a door 8. This door, instead of swinging, as in the patent above described, slides longitudinally on guide-ways 9 and 10. In the casing are rotors 11 and 12, and the casing is formed with a neck 13, in which there is a floating weight 14, as shown and described in U. S. Patent 1,200,070. The casing 6 rests upon a housing 15 in which are mounted two sheeting-rolls 16 and 17, arranged to be driven by any suitable means. Arranged adjacent to the roll 17 is a stripper 18, and arranged adjacent to the roll 16 is a stripper 19. Beneath the rolls is an endless apron 20, driven by suitable means. This apron, instead of extending in a straight line, as shown in Fig. 2 of the drawings, may pass over elevated rolls 21 and 22, more or less in number, between which the apron will sag, and so that the stock carried on the apron will have more time to cool before it is finally discharged. As shown in Fig. 2 of the drawings, the apron is driven by the pulley 23 with a belt 24 and, obviously, various means for driving the belt may be employed. Instead of employing the stripper 19, I may provide the roll 16 with a cutting-blade 25. After the rubber has been properly mixed in casing 6, the door 8 will be open to allow it to drop out and fall by gravity to a point between the sheeting-rolls 16 and 17, being guided thereto by guide-plates 26 and 27. As the sheeting-rolls turn the rubber is drawn down between them, and if it tends to stick to the roll 17, will be removed therefrom by the stripper 18 and passed on to the apron 20, by which it is carried to any convenient point. On the other hand, if the mass tends to stick to the roll 16, it will be detached therefrom by the stripper 19 and dropped onto the apron 20. Instead of employing two sheeting-rolls, I may employ a single roll 28, like the roll 16, but instead of having the roll 17, I have the fixed-abutment 29, which also forms a guide and between which and the roll 28 the stock may pass and be delivered in sheet form in substantially the same way as though two rolls were employed.

It will thus be seen that the mixed material may be delivered from the mixer by the operator in charge and without further attention passed between the sheeting-rolls, and be delivered to some distant point without intermediate handling.

I claim:

1. In a machine of the class described, the combination with a mixer having a downwardly-opening discharge-passage and a closure therefor, of sheeting means positioned with respect to the said mixer to receive therefrom, by the action of gravity, material mixed therein when the said closure is opened, whereby the mixing and sheeting of the material is effected without intermediate handling.

2. In a machine of the class described, the combination with a mixer having a downwardly-opening discharge-passage and a closure therefor, of sheeting means comprising a sheeting-roll positioned with respect to the said discharge-opening of the mixer to permit the mixed material to be fed by gravity from the mixer direct to the sheeting means without intermediate handling.

3. In a machine of the class described, the combination with a mixer having a downwardly-opening discharge-passage and a closure therefor, of sheeting means including a pair of sheeting-rolls positioned with respect to the said discharge-opening to receive mixed material direct from the mixer when the closure thereof is opened, whereby the intermediate handling of the mixed material is eliminated.

4. In a machine of the class described, the combination with a mixer having a downwardly-opening discharge-passage and a closure therefor, of a base upon which the said mixer is mounted and sheeting means located in the said base at a point below the said discharge-opening, so that, when the closure is open, the mixed material will descend by gravity direct from the mixer to the sheeting means, whereby intermediate handling of the mixed material is avoided.

5. In a machine of the character described, the combination with a mixer having a downwardly-opening discharge-passage and a closure therefor, of a base upon which the said mixer is mounted, sheeting means located in the said base at a point below the said opening for the gravity feed of the mixed material directly to the sheeting means, whereby the intermediate handling of such material is avoided, and a conveyor passing through the said base and positioned to remove the material when sheeted by the said sheeting means.

6. In a rubber working machine, a chamber adapted to open substantially throughout its length and means, substantially co-extensive with the length of the chamber to discharge material therefrom in sheet form.

7. A rubber compounding machine, including a mixing chamber, sheeting rolls substantially coextensive in length with said chamber, positioned adjacent thereto, and means to open said chamber substantially throughout its length to deliver the compounded material to said rolls.

In testimony whereof, I have signed this specification in the presence of two subscribing witnesses.

F. H. BANBURY.

Witnesses:
  FREDERIC C. EARLE,
  MALCOLM P. NICHOLS.